(12) United States Patent
Smallwood et al.

(10) Patent No.: US 8,848,587 B2
(45) Date of Patent: Sep. 30, 2014

(54) MULTICASTING NETWORK PACKETS

(75) Inventors: Mark A. L. Smallwood, Beaconsfield (GB); Michael J. Clarke, Oxford (GB); Mark A. French, Amersham (GB); Martin R. Lea, Chalfont St. Peter (GB)

(73) Assignee: Alcatel Lucent, Boulogne-Billancourt (FR)

( * ) Notice: Subject to any disclaimer, the term of this patent is extended or adjusted under 35 U.S.C. 154(b) by 2037 days.

(21) Appl. No.: 10/831,245

(22) Filed: Apr. 23, 2004

(65) Prior Publication Data

US 2004/0215961 A1  Oct. 28, 2004

Related U.S. Application Data

(60) Provisional application No. 60/465,653, filed on Apr. 25, 2003.

(51) Int. Cl.
*H04H 20/71* (2008.01)
*H04L 12/18* (2006.01)

(52) U.S. Cl.
CPC .................................. *H04L 12/1886* (2013.01)
USPC ........... 370/312; 370/390; 370/413; 370/415; 370/395.42; 370/352; 370/235; 370/395.4; 370/432

(58) Field of Classification Search
USPC .......................... 370/312, 315, 390, 413, 432
See application file for complete search history.

(56) References Cited

U.S. PATENT DOCUMENTS

| 5,497,369 | A * | 3/1996 | Wainwright | 370/390 |
| 6,201,792 | B1 * | 3/2001 | Lahat | 370/236 |
| 6,212,182 | B1 * | 4/2001 | McKeown | 370/390 |
| 7,050,440 | B2 * | 5/2006 | Colmant et al. | 370/395.1 |
| 7,151,777 | B2 * | 12/2006 | Sawey | 370/413 |
| 7,649,882 | B2 * | 1/2010 | Stiliadis | 370/390 |
| 7,782,885 | B1 * | 8/2010 | Sabato et al. | 370/412 |
| 2002/0057675 | A1 * | 5/2002 | Park | 370/352 |
| 2005/0141502 | A1 * | 6/2005 | Kumar et al. | 370/390 |

OTHER PUBLICATIONS

Prabhakar, B. et al.: *Multicast Scheduling for Input-Queued Switches*. IEEE Journal on Selected Areas on Communications, IEEE Inc. New York, US. vol. 15, No. 5, Jun. 1997, pp. 855-866 XP000657038.

Marsan, M. A. et al.: *Optimal multicast scheduling in input-queued switches*, ICC 2001. 2001 IEEE International Conference On Communications. Conference Record. Helsinky, Finland, Jun. 11-14, 2001, IEEE International Conference on Communications, New York, NY: IEEE, US. vol. 1 of 10. Jun. 11, 2001, pp. 2021-2027, XP010553675.

Lee, Sun-Ho et al.: *Packet-scheduling algorithm based on priority of separate buffers for unicast and multicast services*. Electronics Letters, IEE Stevenage, GB. vol. 39, No. 2, Jan. 23, 2003, pp. 259-260, XP006019733.

* cited by examiner

*Primary Examiner* — Willie J Daniel, Jr.
(74) *Attorney, Agent, or Firm* — Van Pelt, Yi & James, LLP

(57) ABSTRACT

Multicasting network packets is disclosed. A total number of copies of a frame, t, to be sent is determined. A number of copies of the frame, m, which is less than a total number of copies of the frame, t, to be made during a current iteration is determined. M copies of the frame are made. The m copies of the frame are then sent to their destinations. The original input frame is provided as output with an indication that the frame should be returned for further processing. Processing of the frame is discontinued during an interval in which other frames are processed. The process is repeated until t copies have been sent.

20 Claims, 3 Drawing Sheets

MULTICASTING NETWORK PACKETS

CROSS REFERENCE TO RELATED APPLICATIONS

This application claims priority to U.S. Provisional Patent Application No. 60/465,653 entitled MANAGING NETWORK PACKET PROCESSOR AND NETWORK TRAFFIC MANAGER INTERACTIONS Apr. 25, 2003 which is incorporated herein by reference for all purposes.

FIELD OF THE INVENTION

The present invention relates generally to network switching. More specifically, multicasting network packets is disclosed.

BACKGROUND OF THE INVENTION

Multicasting of a network packet or frame is sometimes performed by configuring a network processor to make as many copies of the frame as may be required for the multicasting and queues up the frames for output. The frames traversing the switch just behind the multicast frame typically must wait until all multicast frames have cleared through the network processor until they can be queued up for output. It would be better if the other traffic could be interspersed with the multicast traffic through an efficient mechanism. In addition, network environments have increasing requirements for complexity in making copies for the multicasting. In particular, it is important for network switches to be able to generate "copies" that are not exact duplicates of the original frame, to allow for network and destination requirements of networks (e.g. virtual private networks and destination specific requirements for multicasting).

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
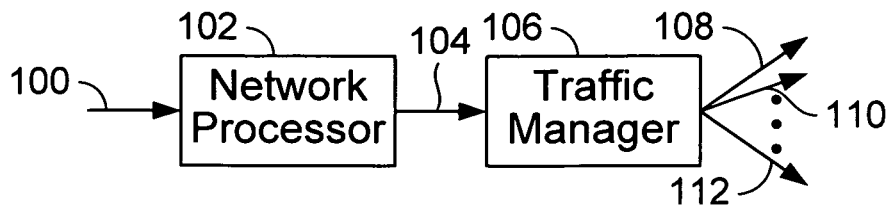
FIG. 1 is a block diagram illustrating multicast processing in a network switch.

FIG. 1 is a block diagram illustrating multicast processing in a simple network switch or network switch element, e.g., in a single queuing stage of a multistage network switch comprising typically an input queuing stage, a switch fabric and an output queuing stage. Frames enter on connection 100 to network processor 102. In some embodiments, the frames are sent into network processor 102 on connection 100 by a device or component configured to receive packets from an external physical port or connection. In some other embodiments the frames are sent into network processor 102 from a traffic manager in a different queuing stage of the switch, sometimes via a switch fabric. In a typical switch, network processor 102 prepares the frames to be forwarded via a traffic manager such as traffic manager 106. In the case of a multicast frame, in typical prior art switches the processor 102 prepares all the copies of the frame and provides the copies as output over connection 104 to traffic manager 106. Traffic manager 106 then queues up all of the frames to be sent to their respective destinations, as represented in FIG. 1 by arrows 108 to 112.

Figure 2A:
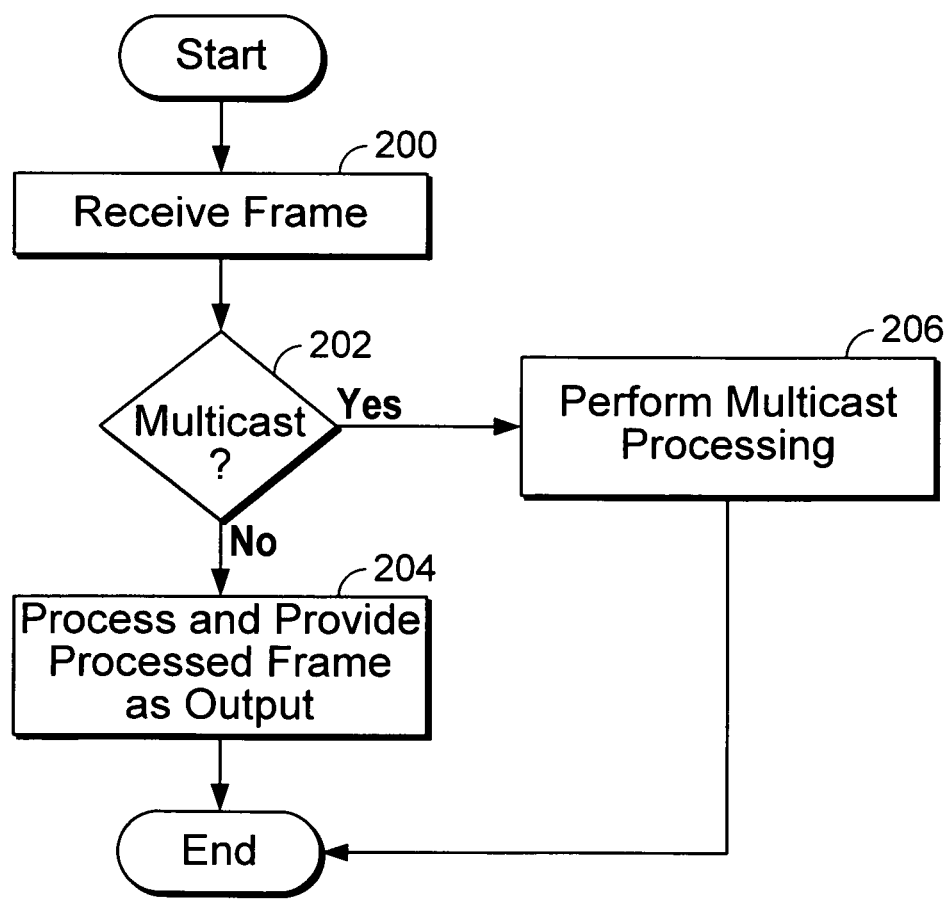
FIG. 2A is a flow diagram illustrating frame processing in a network switch.

FIG. 2A is a flow diagram illustrating frame processing in a network switch. In step 200, a frame is received. In step 202, it is determined whether the frame is to be multicast. In some embodiments, the determination made in step 202 is made based at least in part on a data value associated with the frame, such as a header value and/or destination address associated with the frame. If the frame is not to be multicast, in step 204 the frame is processed and the processed frame is provided as output, e.g., to a traffic manager device or process configured to send the frame on to its final destination, after which the process of FIG. 2A ends. If it is determined in step 202 that the frame is to be multicast, multicast processing is performed in step 206.

Figure 2B:
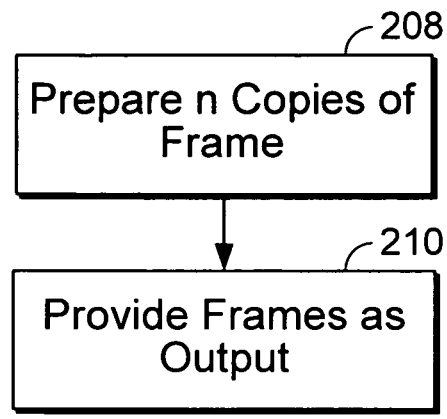
FIG. 2B is a flow diagram illustrating multicast frame processing in a network switch.

FIG. 2B is a flow diagram of a process used in some embodiments to process a multicast frame. In step 208, the required n copies of the frame are prepared. In some embodiments, the copies may not be exact duplicates and may instead have some differences depending on the nature or complexity of the network or destination of the frame. For example, in the case of virtual private networks and other network services it may be necessary to send via a single physical port slightly different versions of a multicast frame addressed to two or more different destinations. In another example, the multicast might be a video stream where some frames are encoded according to the PAL standard and others for the NTSC standard, for example, in which case it would be necessary to send the PAL frames to the destinations configured to receive PAL frames and NTSC frames to all others. In step 210, the n copies of the frame are provided as output, e.g., to a traffic manager such as traffic manager 106 of FIG. 1, to be sent to their proper destinations.

In a typical prior art layer 2 (L2) switch, for example, the process shown in FIGS. 2A and 2B is implemented by the frame processor, which makes all the required copies and provides them as output to a traffic manager, where each copy is queued for delivery to the destination to which it is addressed. However, when the frame processor (e.g., network processor 102 of FIG. 1) is required to make all of the copies, frames received subsequent to the multicast frame may have to wait to be processed, regardless of their priority, while all of the copies are made and provided as output, a condition sometimes referred to as "head of line blocking". For example, in the embodiment shown in FIG. 1, all of the copies of the multicast frame must travel over connection 104 (see FIG. 1). In this situation, a subsequent frame entering on connection 100 to network processor 102 that is destined to destination 108 by traffic manager 106 must wait until all the multicast traffic has been processed by network processor 102 and provided as output via connection 104. This problem can be exacerbated in implementations in which not all copies of the frame are identical, e.g., to accommodate differences in encapsulation, transport protocol, encoding, etc.

Figure 3:
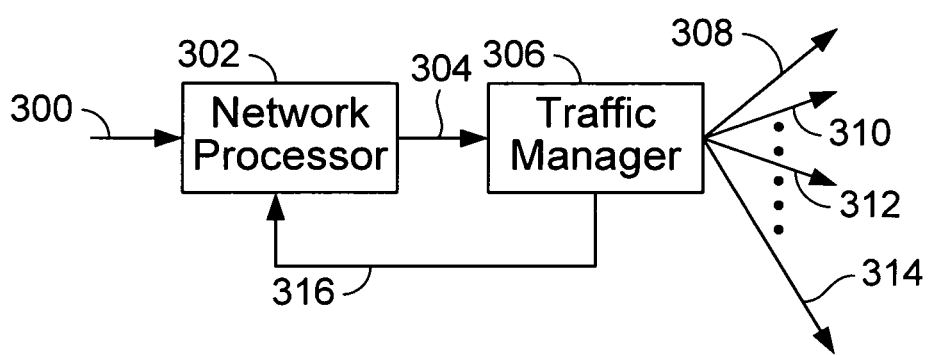
FIG. 3 is a block diagram illustrating alternate multicast processing in a network switch.

FIG. 3 is a block diagram illustrating alternate multicast processing in a network switch. Frames enter on connection 300 to network processor 302. Network processor 302 prepares the frames to be sent to the traffic manager. In one embodiment, the network processor 302 determines whether a frame is a unicast (single destination) frame or a multicast frame, as in FIG. 2A, and processes each frame accordingly. In the case of a multicast frame, in one embodiment the network processor prepares m copies of the frame and provides them as output on connection 304 to a traffic manager 306 for delivery to the first m destinations of the total set of destinations to which the multicast frame is required to be sent, represented in FIG. 3 by destinations 308-314. In some embodiments, the number of frames sent per iteration (m) is a predetermined value. In some embodiments, it is a user configurable parameter. In some embodiments, the number of frames sent per iteration (m) is determined dynamically by the network processor 302 based on such factors as the total number of destinations (t) to which the multicast frame will be sent, the number of copies already sent, the number of copies remaining to be sent, switch fabric congestion, input/output module workload, network processor load, the priority level of the multicast frame, time of day, etc. The network processor keeps track of the destinations to which the multicast frame has been sent and the remaining destinations to which it still must be sent. If the total number of destinations t is greater than the maximum number of frames m that the network processor is configured to prepare and send in any one iteration, and at the end of any iteration after which additional destinations remain to be serviced, the network processor 302 also outputs the original input frame marked to be returned to the network processor for further processing. At a later time, according to some scheduling algorithm, the traffic manager 306 sends the original input frame back to the network processor 302 via connection 316 to allow the network processor 302 to prepare the next m copies of the frame. In some embodiments, the number of copies prepared in each iteration may change dynamically based on real time monitoring of conditions such as those described above. Network processor 302 prepares the next m copies of the frame and provides them as output over connection 304 to traffic manager 306, as described above. Successive iterations of this process are repeated until all t copies have been sent to their respective destinations.

Figure 4:
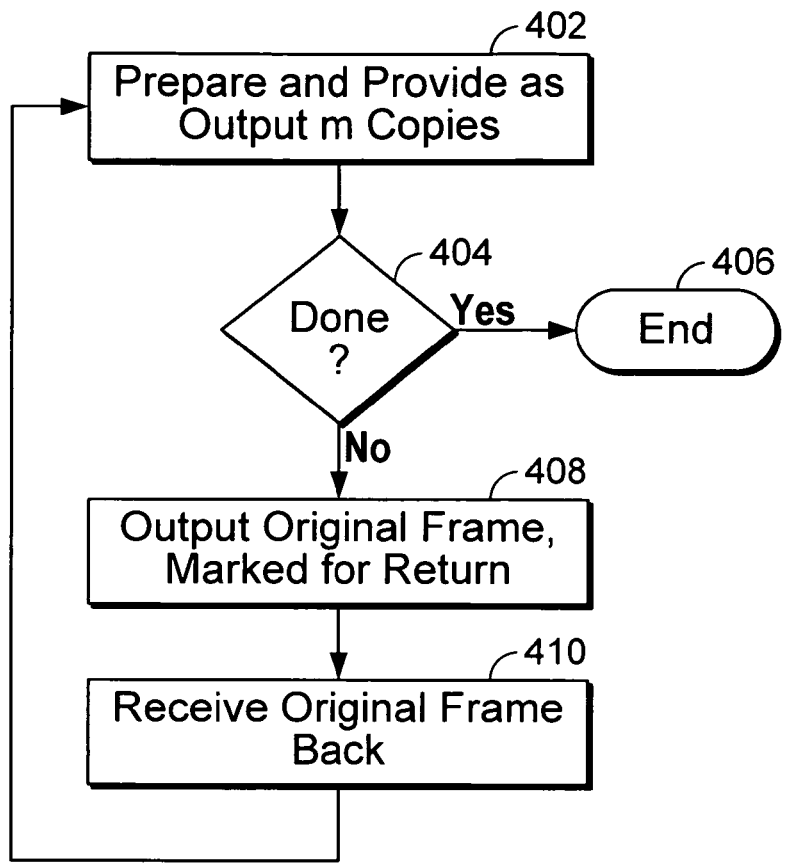
FIG. 4 is a flow diagram illustrating multicast frame processing in a network switch.

FIG. 4 is a flow diagram illustrating a process for processing multicast frames in a network switch. In step 402, m copies of the frame are prepared and provided as output, e.g., to a traffic manager device or process, for delivery to their respective destinations. In step 440, it is determined whether all required copies of the multicast frame have been made and sent. If it is determined in step 404 that the frames sent in step 402 were the final copies required to be sent, the process ends in step 406. If it is determined in step 404 that additional copies remain to be prepared and sent, in step 408 the original input frame is provided as output marked in a way that indicates that the frame is to be returned for further processing. In step 410, the original input frame is received again, and the next m copies of the multicast frame are prepared and provided as output, after which the process repeats through as many iterations as are necessary to prepare and send all of the required copies.

All of the copies of the multicast frames in this case, must travel over connection 304 (see FIG. 3). In this situation, however, because only a limited number of copies m are made in any iteration, where m may be smaller than t, a subsequent frame entering on connection 300 to network processor 302 that is destined to be output to one of the destinations 308-314, e.g., by traffic manager 306 need only wait until m copies of the multicast frame have been processed by the network processor 302 and provided as output over connection 304.

Figure 5:
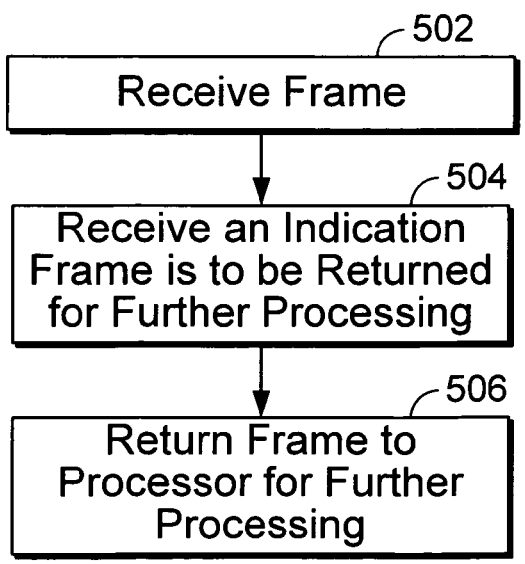
FIG. 5 is a flow diagram illustrating the operation of a traffic manager with respect to a multicast frame.

FIG. 5 is a flow chart illustrating a process implemented on a traffic manager device or process, such as the traffic manager 306 of FIG. 3, to process a multicast frame. In step 502, a frame is received. In step 504, an indication is received that the frame is a multicast frame that is to be returned to the network processor for further processing. In some embodiments, the indication comprises receiving and/or reading a data value associated with the frame, such as a value in an encapsulation header. In step 506, the frame is returned to the network processor for further processing. In some embodiments, the frame is returned to the network processor after a prescribed interval. In some embodiments, the prescribed interval is user configurable. In some embodiments, the frame is returned to the network processor after an interval indicated by the network processor. In some embodiments, the frame is returned at a time based on one of more factors such as a priority associated with the frame, the number and priority of packets waiting in queues to be service by the network processor, and/or other factors.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for multicasting a data frame comprising:
    preparing at a network processor m copies of the frame, the number m being less than a total number of copies of the frame, t, to be sent, wherein the number m is predetermined and wherein the number m is user configurable;
    providing the m copies to a traffic manager configured to queue each copy in its respective input queue;
    providing the original input frame to the traffic manager with an indication that the frame should be returned to the network processor for further processing;
    discontinuing processing the frame at the network processor during an interval during which one or more frames other than the frame being multicast may be processed; and
    repeating until t copies have been sent.

2. A method for multicasting as in claim 1 further comprising determining the number of copies m to be prepared.

3. A method for multicasting as in claim 2 wherein determining the number of copies m to be prepared depends on the number of copies of the frame that have already been sent.

4. A method for multicasting as in claim 2 wherein determining the number of copies m to be prepared depends on the total number of copies of the frame, t, to be sent.

5. A method for multicasting as in claim 2 wherein determining the number of copies m to be prepared depends on a traffic level.

6. A method for multicasting as in claim 2 wherein determining the number of copies m to be prepared depends on a priority level associated with the frame.

7. A method for multicasting as in claim 1 further comprising receiving the frame back at the network processor and preparing at the network processor the next set of m copies in response to receiving the frame back.

8. A method for multicasting as in claim 1 wherein a copy of the frame may be different than one or more other copies of the frame.

9. A method for multicasting as in claim 1 wherein the number m is determined at least in part by one or more of the following factors: a total number of destinations to which the frame will be sent, a number of copies of the frame already sent, a number of copies of the frame remaining to be sent, a load of the network processor, a priority level of the frame, and a time of day.

10. A method for multicasting as in claim 1 wherein successive iterations of receiving the frame, preparing m copies, providing the m copies to the traffic manager, providing the original frame to the traffic manager, and discontinuing processing the frame during an interval during which one or more frames other than the frame being multicast may be processed are completed until all t copies of the frame have been prepared and provided to the traffic manager.

11. A device for multicasting a data frame comprising:
an input interface configured to receive the frame; and
a frame processor configured to:
prepare m copies of the frame, the number m being less than a total number of copies of the frame, t, to be sent, wherein the number m is predetermined and wherein the number m is user configurable;
provide the m copies to a traffic manager configured to queue each copy in its respective input queue;
provide the original input frame to the traffic manager with an indication that the frame should be returned to the frame processor for further processing; and
discontinue processing the frame during an interval during which one or more frames other than the frame being multicast may be processed.

12. A device as in claim 11 wherein the processing further comprises a further iteration of preparing m copies of the frame, providing the m copies to the traffic manager, and discontinuing processing the frame during an interval during which one or more frames other than the frame being multicast may be processed.

13. A device as in claim 12 in which successive iterations of receiving the frame, preparing m copies, providing the m copies to the traffic manager, providing the original frame to the traffic manager, and discontinuing processing the frame during an interval during which one or more frames other than the frame being multicast may be processed are completed until all t copies of the frame have been prepared and provided to the traffic manager.

14. A device as in claim 11 wherein the frame processor is further configured to determine the number of copies m to be prepared.

15. A device as in claim 11 wherein the number m is determined at least in part by one or more of the following factors: a total number of destinations to which the frame will be sent, a number of copies of the frame already sent, a number of copies of the frame remaining to be sent, a load of the frame processor, a priority level of the frame, and a time of day.

16. A device as in claim 11 wherein a copy of the frame may be different than one or more other copies of the frame.

17. A computer program product for multicasting a data frame, the computer program product being embodied in a non-transitory computer readable medium and comprising computer instructions for:
preparing at a network processor m copies of the frame, the number m being less than a total number of copies of the frame, t, to be sent, wherein the number m is predetermined and wherein the number m is user configurable;
providing the m copies to a traffic manager configured to queue each copy in its respective input queue;
providing the original input frame to the traffic manager with an indication that the frame should be returned to the network processor for further processing;
discontinuing processing the frame at the network processor during an interval during which one or more frames other than the frame being multicast may be processed; and
repeating until t copies have been sent.

18. A computer program product as in claim 17 wherein successive iterations of receiving the frame, preparing m copies, providing the m copies to the traffic manager, providing the original frame to the traffic manager, and discontinuing processing the frame during an interval during which one or more frames other than the frame being multicast may be processed are completed until all t copies of the frame have been prepared and provided to the traffic manager.

19. A computer program product as in claim 17 wherein the number m is determined at least in part by one or more of the following factors: a total number of destinations to which the frame will be sent, a number of copies of the frame already sent, a number of copies of the frame remaining to be sent, a load of the network processor, a priority level of the frame, and a time of day.

20. A computer program product as in claim 17 wherein a copy of the frame may be different than one or more other copies of the frame.

* * * * *